Oct. 25, 1955  J. LITVAN ET AL  2,721,358

PROCESS OF TREATING CUT, RIPENED LINSEED FLAX STRAW

Filed May 15, 1951

INVENTOR.
JOZSEF LITVAN &
ALADAR GLASER
By Young, Emery & Thompson
ATTYS.

United States Patent Office 2,721,358
Patented Oct. 25, 1955

2,721,358

PROCESS OF TREATING CUT, RIPENED LINSEED FLAX STRAW

Jozsef Litvan and Aladar Glaser, Budapest, Hungary

Application May 15, 1951, Serial No. 226,406

6 Claims. (Cl. 19—7)

This application is a continuation-in-part of our co-pending application Serial No. 126,328 filed November 9, 1949, and now abandoned. This invention relates to methods of processing ripened linseed flax straw.

The bast fibre in much ripened linseed flax straw is generally of too poor a quality for linen but can be used in various coarser arts as so-called tow especially for producing cereal bags which up to now are generally made of jute yarn. One difficulty with ripened linseed flax straw is that in ripening the woody shive is more tightly adherent to the fibres than in fibre flax and can not readily be removed. No process is hitherto known adapted to remove all of the shive from the bast of ripened linseed flax straw at a practical cost and yet preserve the fibre so as to produce a fibre adapted to spinning purposes.

The object of the present invention is to separate the bast and shive of ripened linseed flax straw in a relatively simple and efficient manner with a yield of about 24–28% of useful bast fiber that is to say practically all of the fibre content in the form of tow.

A particular object of the invention is to subject ripened linseed flax straw with a determined water content to decorticating action by softening elements of the straw and mechanically acting on the straw in order to break it, to rub the shive off the fiber and remove the shive while preserving a useful fibre adapted to spinning purposes.

Another object is to provide a process in which the raw fibrous substance is dealt with as follows:

It is tank retted preferably in baled form in order to remove the gum that makes the bast adhere to the woody part. Thoroughly degumming of the substance is of basic importance in order to get rid of the shive by a very gentle decorticating process.

The retted substance is dried until its water content decreases to 7–14%, preferably 7–10%, and this humidity range is maintained during the whole decorticating and separating processes by air conditioning the room where these processes are carried out.

The deshived bast is preferably subjected to seasoning and then spun into yarns up to a yarn number of 4–4.5 lea=2700 m./kg. These yarns are adapted to weave cereal bags or the like with a quality about equal to that of jute bags.

Although the aforesaid processes can be carried out with various machines, certain arrangements and types have been found to be particularly advantageous, and are illustrated diagrammatically in the accompanying drawing.

Figure 1:
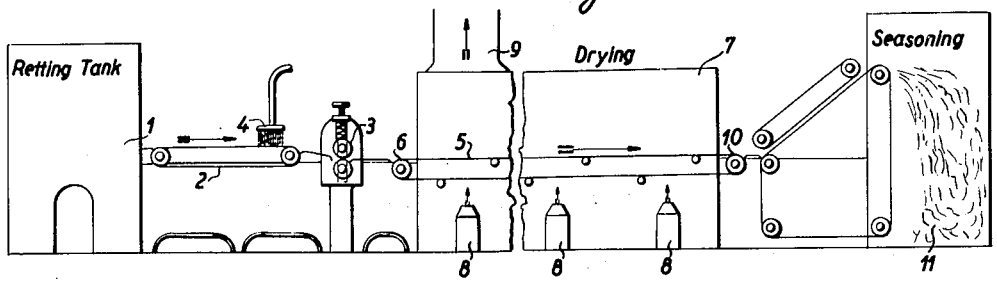
Fig. 1 is a schematic elevational view of apparatus for treating and seasoning flax according to this invention.

The ripened and deseeded linseed flax straw is preferably delivered in the form of bales. In order to preserve the straw the weight of one cubic meter of the pressed bales shall not exceed 100 kg. These bales are placed in a concrete tank 1, as shown in Fig. 1, one bale upon the other until the tank is completely filled with the straw. The tank then will be filled with water, the temperature of this water at the beginning of the retting being kept rather low at about 24–26° C. and then during the retting preferably elevated to about 28–30° C. The poorer the substances, that is to say the lesser the strength of the fibre the lower the temperature of the retting operation. The first condition of good retting is that the substance be perfectly free of green stalks in order to prevent too high an acidity of the leach water. The starting temperature in the case of a very poor substance should preferably be kept at 20° C. when the time necessary for complete retting will correspondingly be longer. The temperature is preferably to be elevated by about 4° C. from the beginning of the retting process up to the end of it. In the case of a very good substance the starting temperature may be at about 30–32° C. elevated during the retting process up to 36° C. max. All along the retting process the acidity of the leach water should be controlled and at all events must not be lower than 5.5 pH. An acidity of pH=6.8–7 has been found the most advantageous. The degumming process will fail to give satisfactory results with an acidity lower than 5.5 pH.

In some cases it would be advantageous to keep the water circulating to a slight degree after the start of the retting process to facilitate more even distribution of temperature and bacteria and cause a uniform ret. For this purpose water at the right temperature is forced into the tank preferably at the bottom causing an overflow at the top. The old retting water may be replaced once during the entire ret and the leach water which contains much soluble material is run to waste. We also obtained very good results by causing the water to stream in the opposite direction that is to say by supplying the fresh water at the top of the tank.

When the flax is judged to be sufficiently retted, i. e. the degumming process has reached the desired degree which takes 2–3½ days according to the type of straw and consequently to the temperature during retting, all the liquor is run off and the bales are removed from the tank 1. They are put on an endless conveyor belt 2 where the bales are opened and fed to a pair of rolls 3 wringing a good part of the liquor out of the straw. Before reaching the rolls 3 the straw passes under warm (24–30° C.) water sprays 4 adjacent the wringing rolls 3 in order to wash out the liquor containing acids and colour substances. This separate wringing device may be dispensed with.

After wringing the straw it is air dried. For this purpose the straw is delivered to an endless belt 5 driven by rollers 6 and 10 carrying the straw along a channel-like chest 7. The straw spread out in a layer of uniform thickness on the upper side of the belt 5 made of a wirework is dried by means of hot air blown into the chest through pipes 8 arranged along the bottom of the chest 7. Through these pipes 8 air currents of various temperatures are blown into the chest, these temperatures increasing from left to right. While the straw is travelling through the chest, air of the lowest temperature of about 50° C. is blown in at the left end of the chest and air of the highest temperature of about 65° C. at the right end of the chest. The thickness of the layer of straw, the quantity of the air blown in and the speed of the transportation through the chest are adjusted so as to reduce the humidity range of the straw from about 50–66.7% at the entrance of the drying chest to at about 7% or less at the outlet near the roller 10.

Instead of artificial drying in a mechanical drier the retted flax may also be dried naturally in the field provided favorable climatic conditions exist.

The straw in this dried state is preferably transported by an endless conveyor belt or any other suitable means to a closed storing room 11. In this room the relative humidity of the air is, by conditioning, maintained at about 60–70% by a temperature of 20–25° C. so that the humidity of the straw is kept within the range of 7–14%, preferably 7–10%. It has been found that this seasoning of the straw which may last several days will put the straw in the best condition for decortication. Although the straw with a water content within the range of 7–14% when leaving the drying device 7 may be at once subjected to decorticating, the relaxation or seasoning of the straw between the drying and decorticating processes contributes largely to the obtaining of fibre with good spinning qualities, viz. greater length and tensile strength of the bast.

Figure 2:
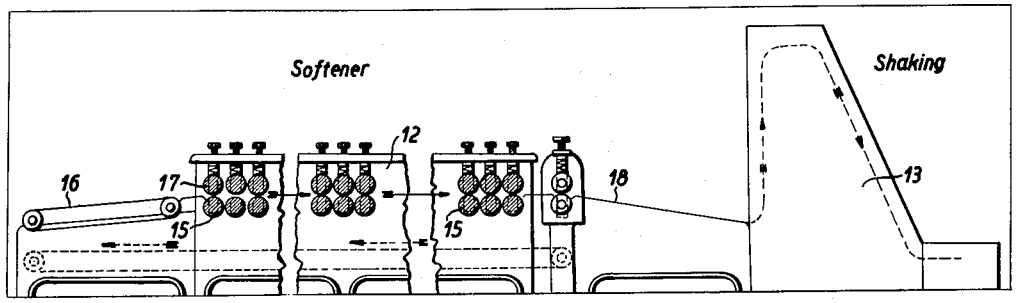
Fig. 2 is a similar view of apparatus employed according to this invention for softening and shaking the flax treated in the apparatus of Fig. 1.

As shown in Fig. 2 the machine 12 for decorticating the flax straw and the shaking device 13 for the separation of bast from shive are built up in a room 14 adjacent to the storing room 11 and also strictly air conditioned in order to maintain the aforesaid humidity of the flax straw while being decorticated and shaken within the range of 7–14% preferably of 7–10%.

The maintenance of the humidity of the flax straw within the said range during the whole mechanical processing is of basic importance in order to separate the bast and shive in a simple and efficient manner and with a high yield of useful bast fiber. In particular we found that with a water content of the straw less than 7% the interlamellar substances such as pectins and the like get hard and fragile because due to exaggerated loss of water these substances coagulate. Therefore the bast is brittle and it would be difficult to remove the bast from the shive and yet preserve the fibre. On the contrary the bast would tend to split into cellulosic crystals, and at all events its tensile strength would be substantially diminished. On the other hand with a water content of more than 14% removing the wooden part of the bast without injuring the bast would be exceedingly difficult, and almost impossible due to adhesive forces caused by the water and acting between the fibres and the wooden part. In this case an energetic mechanical action on the straw would be necessary which would injure the bast to an inadmissible degree. Therefore temperature and relative humidity of the air during decorticating and shaking, in the example shown temperature and humidity in the room 14, are to be controlled continuously and a relative humidity range of about 60–70% at about 20–25° C. should be maintained.

Under these conditions the decorticating operation can be a very soft one. It should be borne in mind that— as it is practically essential in order to get the desired yield and spinning qualities of the fibre—it be manipulated in the various stages in such a manner as not to impart harsh treatment to the fibres. The relatively gentle treatment of the fibre throughout the decorticating and shaking processes is to be insured in order that the fibre shall retain all of its original tensile strength and other desirable qualities without the impairment which might result from rough mechanical handling. It is intended to maintain the fibres as far as possible in their original unbroken length and in substantial alignment throughout the process in order to avoid breakage. By working with artificial drying and air conditioning as described above the process is substantially a continuous one adapted to operate on a definite time schedule.

In order to realize this gentle operation a softening machine 12 as used for the manufacture of jute fibres has proved to be well adapted. In this machine the fibre is run between a long series of rolls which are provided with spiral grooves. We preferably use a known type of this machine consisting of sixty-three pairs of spirally grooved rollers 15 under spring tension mounted in a solid cast iron frame. The straw with the prescribed water content is led on the feed sheet 16 from which it is drawn into the said series of spirally grooved rollers 15 by means of longitudinally grooved feeding rolls 17. The ridges and intervening grooves of both the feed rolls 17 and the softening rolls 15 are curved so as to avoid brutal breaking effects, whereby the grooves of one roller in each pair of rollers 15 is arranged in a spiral direction reverse from the spiral direction of the groove of the other roller and with the direction of the grooves in any pair of rollers reverse to the direction of the grooves in a next succeeding pair of rollers. The spiral grooves have the effect of spreading the fibres over the length of the rollers which makes the treatment thereof more effective. The lower roll of each of the said pairs is rotatively mounted in a fixed bearing while the upper of said rolls is rotatively mounted in a yielding bearing, which is both manually and automatically adjustable with respect to the lower roll. These rolls are designed to operate so that the flutings of each pair are intermeshed with each other but with a clearance space of at least 10 mm. between them measured from the top of a rib to the bottom of the opposite groove in the nearest position. The number of grooves in each roller or a pair of rollers is the same, but the number of grooves and the spring tension acting on subsequent pairs of rollers increases from left to right. This arrangement is adapted to cause the rolls to mildly flex the straw as it passes through them tending to break the woody portions into short sections and to loosen them from the fibres themselves. As the rolls are thus meshing as uniformly as possible they effect longitudinal splintering of the woody part of the stalks, the uniform transverse spreading and opening of the stalk and the loosening and separation of the individual fibres, finally removing them from the shive by abrasion. In this manner by the time a straw has been carried around beneath all the rollers it has been broken and its shive or woody portion has been reduced to fragments. The above said humidity range thereby facilitates the separation of bast and shive and the fibre is strong and flexible enough to resist this mechanical treatment and comes through as a long unbroken fibre. As a result of this treatment the fibrous stalks shed a considerable portion of their woody content before they reach the last pair of rolls 15 and are caught up by an endless belt travelling beneath the rollers and carrying away the shive falling downwardly.

From the decorticating unit 12 the partly cleaned fibre or web is by suitable conveying means 18 delivered to a shaking device 13, where it is liberated from a further portion of shives. The shaking device 13 may be of any well known design having an inclined vibratory shaker rack to effect a progressive rearward movement of the fibre as it is being shaken to free the same from the shives. In order to avoid knots in the fibre substance and to preserve a useful fibre of great strength and good spinning qualities no scutching is applied. The tow delivered at the output of the shaking device has a shive content of about 5–20%.

The described machine 12 does not injure the fibre and by softening the straw it only breaks the woody stalks which in linseed flax straw are thoroughly ripened and therefore liable to brittle away. Should however the separation of bast and shive by passing through the softener once not reach the desired degree, the tow leaving at the right end of the machine can after the shaking process be fed again to the same or a second softener, until the content of shive reaches about 5–20%. Using a softener with 63 pairs of rolls the softening and shaking action is preferably repeated once or twice.

This relatively high content of shive after the shaking process is aimed at intentionally in order to realize a very soft decorticating operation. The content of shive diminishes further during the carding process and the shearing on both sides of the fabric made of the thread until about 2–5%. Until this stage of the process the humidity of the straw or tow must be maintained within the range of 7–14% preferably of 7–10%. Therefore decorticating and shaking must be performed in an air-conditioned room as already pointed out above.

After shaking the tow it is subjected to a seasoning or ripening process in order to soften the fibre and raise its strength. For this purpose the bast is first preferably handled with an emulsion containing oils as used for the batching of jute fibres. The degree of batching is regulated so as to bring up 2–5% oil on the fibre. Well adapted batching emulsions are known in the art. In the ripening room the tow is heaped up and is relaxed for a period of about 2–4 weeks according to the quality of the fibre. This room is also air-conditioned and has a well controlled temperature of about 8–15° C. and a relative humidity of about 60–70%. This seasoning process may preferably take place in a cellar. After this seasoning the strength of the fibre was increased by about 25%.

Then the tow is carded by carding machines which comb out the short and tangled fibres and shives and then the band reaches the spinning machines which twist it into yarn. With the method according to this invention and applied to ripened linseed flax straw we succeeded in obtaining yields which average 23–26% and spinning yarns up to 5 lea=3000 m./kg. yarn number. These yarns may be doubled and twisted into threads of various kinds, binder twines, bookbinders' twines, parcelling twines, yarns for roughs and industrial fabrics, such as crash, toweling and the like.

What we claim is:

1. The process of treating cut, ripened linseed flax straw comprising subjecting the ripened linseed flax straw to a biological retting process to remove the gums therefrom, drying the straw, seasoning the dried straws by storing the same in a chamber containing an atmosphere having a humidity of 60–70% and a temperature of about 20–25° C. to maintain the humidity of the straw at about 7–14%, decorticating the fibres of the straws by mechanical softening means in order to disengage the softened shive and the bast fibre, separating the fibre from the shive and maintaining the humidity of the straw within the range of 7–14% during the whole decorticating and separating operations.

2. The process of treating cut, ripened linseed flax straw which includes subjecting the straws to a biological retting process to remove the gums therefrom, drying the straw, seasoning the dried straws by storing the same in a chamber containing an atmosphere having a humidity of 60–70% and a temperature of about 20–25° C. to maintain the humidity of the straw at about 7–14%, decorticating the fibres by mechanical softening means in order to disengage the softened shive and the bast fibre, separating the fibre from the shive and maintaining the humidity of the straws within the range of 7–14% during the whole decorticating and separating operations and seasoning the tow before carding by batching the same with an emulsion to bring up to 2–5% oil on the fiber and then storing the tow for a period of about 2–4 weeks in a ripening zone containing an atmosphere having a relative humidity of about 60–70% and a temperature of about 8–15° C.

3. The process of treating cut, ripened linseed flax straw fibres which includes subjecting the straws to a bioligical retting process to remove the gums therefrom, drying the straws by hot air, seasoning the dried straws by storing the same in a chamber containing an atmosphere having a humidity of 60–70% and a temperature of about 20–25° C. to maintain the humidity of the straw at about 7–14%, decorticating the fibres by mechanical softening means in order to disengage the softened shive and the bast fibre, separating the fibre from the shive by shaking the tow, maintaining the humidity of the tow within the range of 7–14% during the whole decorticating and shaking operations.

4. The process of treating cut, ripened linseed flax straw which includes subjecting the straws to a biological retting process to remove the gums therefrom, drying the straws in order to lower the water content to about 7–10% in a spread out state by hot air blown through the straw-layer, seasoning the dried straws by storing the same in a chamber containing an atmosphere having a humidity of 60–70% and a temperature of about 20–25° C. to maintain the humidity of the straw at about 7–14%, disengaging the shive from the bast by a softening operation, separating the fibre from the shive by shaking the tow, maintaining the humidity of the straws within the range of 7–14% during the whole decorticating and shaking operations and seasoning the tow before carding, by batching the same with an emulsion to bring up to 2–5% oil on the fiber and then storing the tow for a period of about 2–4 weeks in a ripening zone containing an atmosphere having a relative humidity of about 60–70% and a temperature of about 8–15° C.

5. The process of treating cut, ripened linseed flax straw which includes subjecting the straw pressed into bales to a biological retting process to remove the gums therefrom, rinsing the retted straw with warm water, wringing the straw until a water content of about 50–66.7%, conveying the straw in the form of a spread out layer through hot air in countercurrent in order to lower its water content to 7–10%, introducing the straw into an air conditioned room in order to maintain its water content to a degree within the range of 7–14% and thereupon subjecting the straw to a mechanical rubbing action and subsequently to a shaking action whereby to remove the shive from the fibre in the straw and maintaining the humidity of the straw within the range of 7–14% during the whole decorticating and shaking operation.

6. The process of treating cut, ripened linseed flax straw which includes subjecting the straws to a biological retting process to remove the gums therefrom, drying the straws by hot air blown through a layer of the straw travelling in countercurrent to the hot air, disengaging the shive from the bast by gently bending and rubbing, separating the fibre from the shive by shaking the straws and maintaining the humidity within the range of 7–14% during the whole mechanical decorticating and shaking operation.

References Cited in the file of this patent

UNITED STATES PATENTS

| | | |
|---|---|---|
| 2,067,497 | McCardle et al. | Jan. 12, 1937 |
| 2,403,331 | Best et al. | July 2, 1946 |
| 2,418,995 | Thomas | Apr. 15, 1947 |

FOREIGN PATENTS

| | | |
|---|---|---|
| 126,203 | Australia | Dec. 9, 1947 |